US012605627B2

(12) United States Patent
Fortuna et al.

(10) Patent No.: US 12,605,627 B2
(45) Date of Patent: Apr. 21, 2026

(54) SECOND SCREEN SYNCHRONIZATION AND HANDOFF

(71) Applicant: SONY INTERACTIVE ENTERTAINMENT INC., Tokyo (JP)

(72) Inventors: Ellana Fortuna, San Mateo, CA (US); Kristie Ramirez, San Mateo, CA (US); Elizabeth Juenger, San Mateo, CA (US); Victoria Dorn, San Mateo, CA (US); Celeste Bean, San Mateo, CA (US); Bethany Tinklenberg, San Mateo, CA (US); Mahdi Azmandian, San Mateo, CA (US); Sarah Karp, San Mateo, CA (US); Ritagya Meharishi, San Mateo, CA (US); Xi Zhou, San Mateo, CA (US)

(73) Assignee: Sony Interactive Entertainment Inc., Tokyo (JP)

( * ) Notice: Subject to any disclaimer, the term of this patent is extended or adjusted under 35 U.S.C. 154(b) by 259 days.

(21) Appl. No.: 18/230,067

(22) Filed: Aug. 3, 2023

(65) Prior Publication Data

US 2025/0041720 A1      Feb. 6, 2025

(51) Int. Cl.
*A63F 13/87*          (2014.01)
*A63F 13/26*          (2014.01)
(Continued)

(52) U.S. Cl.
CPC .............. *A63F 13/50* (2014.09); *A63F 13/26* (2014.09); *G06F 3/1431* (2013.01); *G06F 3/0482* (2013.01)

(58) Field of Classification Search
None
See application file for complete search history.

(56) References Cited

U.S. PATENT DOCUMENTS

2003/0212762 A1    11/2003  Barnes et al.
2017/0354892 A1*   12/2017  Benedetto ............. A63F 13/216
(Continued)

OTHER PUBLICATIONS

PCT Application No. PCT/US2024/033655, International Search Report and Written Opinion dated Aug. 19, 2024.
(Continued)

*Primary Examiner* — Lawrence S Galka
(74) *Attorney, Agent, or Firm* — Kilpatrick Townsend & Stockton LLP

(57) ABSTRACT

Systems and methods for dynamic content display generation for multiple device setups are provided. Supplemental content files associated with an interactive content title may be stored in memory in association with parameters specific to different types of user devices. A current interactive session associated with a first device may be monitored and determined to include a virtual environment presentation associated with the interactive content title. A type of a secondary device associated with the user may be identified. A supplemental content package may be generated for the secondary device based on a selected set of supplemental content and a set of the parameters associated with the type of the secondary device. The supplemental content package may be provided to the secondary device during the current interactive session, and the secondary device may generate a presentation of the selected set of supplemental content files in accordance with the set of parameters.

21 Claims, 5 Drawing Sheets

Device Setup
210A

Secondary Device
210B

Secondary Device
210C

(51) Int. Cl.

| | |
|---|---|
| *A63F 13/31* | (2014.01) |
| *A63F 13/50* | (2014.01) |
| *A63F 13/58* | (2014.01) |
| *G06F 3/14* | (2006.01) |
| G06F 3/0482 | (2013.01) |

(56) References Cited

U.S. PATENT DOCUMENTS

| | | | |
|---|---|---|---|
| 2020/0380565 A1 * | 12/2020 | Spitz | H04N 21/4316 |
| 2021/0326094 A1 | 10/2021 | Buerli et al. | |
| 2021/0326594 A1 | 10/2021 | Costello et al. | |

OTHER PUBLICATIONS

PCT/US2024/033655, WO, Ellana Fortuna, Second Screen Synchronization and Handoff, Jun. 12, 2024.

* cited by examiner

100

Content Server
110

Synchronization
Server
120

APIs
150

Content
Generation
170

Learning
Models
160

Content
Delivery
180

Databases
130

User Device 140A

User Device 140B

User Device 140C

User Device 140D

Device Setup
210A

Secondary Device
210B

[Directions]

Secondary Device
210C

SECOND SCREEN SYNCHRONIZATION AND HANDOFF

BACKGROUND OF THE INVENTION

1. Field of the Invention

The present invention generally relates to screen coordination. More specifically, the present invention relates to dynamic content displays relating to interactive content generation and synchronization across multiple device setups.

2. Description of the Related Art

Presently available digital interactive content titles may include audio-visual, interactive (e.g., game), and other types of data presented in association with a virtual environment. Playing such digital content (e.g., interactive game titles and other content titles associated with virtual environments) may therefore involve using one or more user devices, including home theater devices, televisions, consoles, controllers, handheld devices, computing devices (including desktops, laptops, tablets, and other mobile devices), speakers and sub-woofers, headsets (including headphones, earphones, or other head- or ear-mounted speakers), and other peripheral or accessory devices that may include associated audiovisual output components. Moreover, each type of user device may have different capabilities and settings available, and the audiovisuals for each user device may appear and/or sound different to the user based on their respective capabilities and settings.

Some user devices may be used concurrently during an interactive session. For example, a game console may be operated in conjunction with a television and home entertainment system. Other user devices, however, may be used outside the home (or other usual gameplay space), during transit or other movement, in the absence of Internet connections, or under other different conditions. Various game titles, however, may not be optimized for multiple different device setups, however, resulting in siloed user experiences that are specific to one device setup. A user may therefore be virtually unable to continue playing a particular game title or other interactive experience when circumstances require a change in conditions.

Depending on the current conditions (e.g., wireless signal strength, available bandwidth) under which a user seeks to engage in an interactive session using a particular user device or combination of user devices, the capabilities of the user device(s) may be impaired or limited, thereby resulting in sub-par or poor user experiences. The user may also face friction or difficulties in porting a current session from one user device setup to another user device setup There is, therefore, a need in the art for improved systems and methods of dynamic content display generation and synchronization for multiple device setups.

SUMMARY OF THE CLAIMED INVENTION

Embodiments of the present invention include systems and methods for dynamic content display generation and synchronization for multiple device setups. Supplemental content files associated with an interactive content title may be stored in memory in association with parameters specific to different types of user devices. A current interactive session associated with a first device may be monitored and determined to include a virtual environment presentation associated with the interactive content title. A type of a secondary device associated with the user may be identified. A supplemental content package may be generated for the secondary device based on a selected set of supplemental content and a set of the parameters associated with the type of the secondary device. The supplemental content package may be provided to the secondary device during the current interactive session, and the secondary device may generate a presentation of the selected set of supplemental content files in accordance with the set of parameters.

DETAILED DESCRIPTION

Embodiments of the present invention include systems and methods for dynamic content display generation and synchronization for multiple device setups. Supplemental content files associated with an interactive content title may be stored in memory in association with parameters specific to different types of user devices. Supplemental content may include any type of content associated with a game title or other interactive content title. For example, supplemental content may include portions or subsets of game content, as well as tutorial content, instructional content, background content, side quests, maps, game or player statistics, user-generated content, etc. A current interactive session associated with a first device may be monitored and determined to include a virtual environment presentation associated with the interactive content title. A type of a secondary device associated with the user may be identified. A supplemental content package may be generated for the secondary device based on a selected set of supplemental content and a set of the parameters associated with the type of the secondary device. The supplemental content package may be provided to the secondary device during the current interactive session, and the secondary device may generate a presentation of the selected set of supplemental content files in accordance with the set of parameters.

Figure 1:
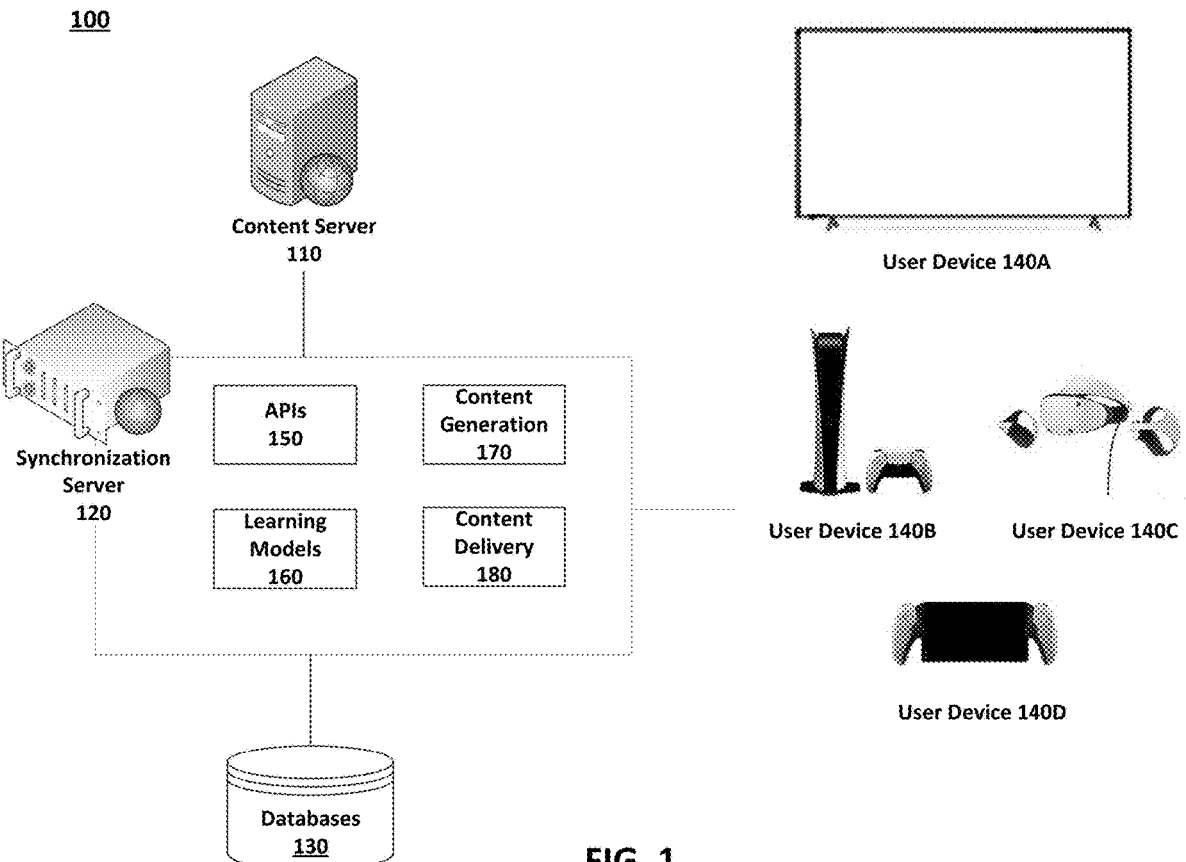
FIG. 1 illustrates a network environment in which a system for dynamic content display generation and synchronization for multiple device setups may be implemented.

FIG. 1 illustrates a network environment 100 in which a system for dynamic content display generation and synchronization for multiple device setups may be implemented. The network environment 100 may include one or more content servers 110 that provide digital content (e.g., games, other applications and services) for distribution, synchronization server(s) 120, database(s) 130, and user devices 140A-D. The devices in network environment 100 may communicate with each other using one or more communication networks, which may include a local, proprietary network (e.g., an intranet) and/or may be a part of a larger wide-area network. The communications networks may be a local area network (LAN), which may be communicatively coupled to a wide area network (WAN) such as the Internet. The Internet is a broad network of interconnected computers and servers allowing for the transmission and exchange of Internet Protocol (IP) data between users connected through a network service provider. Examples of network service providers are the public switched telephone network, a cable service provider, a provider of digital subscriber line (DSL) services, or a satellite service provider. One or more communications networks allow for communication between the various components of network environment 100.

The servers described herein may include any type of server as is known in the art, including standard hardware computing components such as network and media interfaces, non-transitory computer-readable storage (memory), and processors for executing instructions or accessing information that may be stored in memory. The functionalities of multiple servers may be integrated into a single server. Any of the aforementioned servers (or an integrated server) may take on certain client-side, cache, or proxy server characteristics. These characteristics may depend on the particular network placement of the server or certain configurations of the server.

Content server 110 may maintain and provide a variety of digital content and digital services (e.g., corresponding to different game titles) available for distribution over a communication network. The content server 110 may be associated with any content provider that makes its content available for access over a communication network (e.g., streaming or download). The content servers 110 may therefore host a variety of different content titles, which may further have be associated with object data regarding a digital or virtual object (e.g., activity information, zone information, character information, player information, other game media or status information, etc.) displayed in a digital or virtual environment during an interactive session.

Such content may include not only digital video and games, but also other types of digital applications and services. Such applications and services may include any variety of different digital content and functionalities that may be provided to user devices 140, including providing and supporting chat and other communication channels. The chat and communication services may be inclusive of voice-based, text-based, and video-based messages. Thus, a user device 140 may participate in a gameplay session concurrent with one or more communication sessions, and the gameplay and communication sessions may be hosted on the same or different content servers 110.

Synchronization server 120 may include any data server known in the art that is capable of communicating with the different content server (s 110, database(s) 130, and user devices 140. Synchronization server 120 may be implemented on one or more cloud servers that carry out instructions associated with interactive content (e.g., games, activities, video, podcasts, user-generated content, publisher content, etc.). The synchronization server 120 may further carry out instructions, for example, for monitoring one or more current interactive sessions with one or more user devices 140 associated with a user. Specifically, the synchronization server 120 may analyze the current interactive session and generate supplemental content packages to present in coordination with (e.g., synchronized to) a current display associated with the current interactive session. The synchronization server 120 may (continually) calibrate and modify the content of the supplemental content package in accordance with the analysis of the current interactive session. Different sets of device parameters may be stored in association with each specific user device 140, as well as usage in different types of spaces (e.g., Jen's Living Room), with digital content titles (e.g., Fortnite), and/or under different sets of conditions (e.g., early morning transit, late night after 12 AM, ambient or environmental sound levels).

While pictured separately, the databases 130 may be stored on any of the servers and devices illustrated in network environment 100 on the same server, on different servers, or in association with any of the user devices 140. Such databases 130 may store or link to various supplemental content used for dynamic content generation and synchronization. A particular game title may be associated with different types of supplemental content and files relating to the same, including game portions or miniature versions of games, side quests, maps, tutorial content, background data and content, game or player statistics, user-generated content, and other related content. Such content may be associated with different virtual objects, characters, activities, events, or other elements of the virtual environment of an interactive content title. The supplemental content may therefore include metadata that links the supplemental content to the associated element of the virtual environment. For example, a virtual object currently on display in the virtual environment may be associated with supplemental content that includes back story, input instructions for different uses or interactions, component diagrams, real-time status (e.g., power level, damage level, current level of abilities). The metadata may also include synchronization data that allows for detection or prediction that the object may need to be used. The prediction may trigger a presentation of supplemental content that includes audiovisual instructions on how to use the object successfully.

In addition, databases 130 may store a variety of different device setup profiles (e.g., associated with a particular set of user devices, content title, or other condition) and information regarding available device settings, as well as content modifications and customizations that may be specific to a particular user, user group or team, user category, game title, game genre, supplemental content types, conditions, etc. For example, a user may be a beginner player for a particular game title, and thus, beginner-level instructional content may be suitable for that user. Conversely, an expert game-player may be more interested in supplemental content regarding advanced strategies and complex maneuvers. In another example, supplemental content relating to visually complex scenes may include audio content that avoids blocking or obstructing the user's field of vision, while gameplay conditions that include noisy surroundings may include more visual or subtitled content.

The user device 140A-D may include a plurality of different types of user devices known in the art. The user device 140 may be a computing device that may include any number of different gaming consoles, display devices, televisions, head-mounted display devices, virtual reality devices, handheld device, mobile devices, laptops, and desktops. Such user devices 140 may also be configured to access data from other storage media, such as, but not limited to memory cards or disk drives as may be appropriate in the case of downloadable or streaming content. Such user devices 140 may include standard hardware computing components such as, but not limited to network and media interfaces, non-transitory computer-readable storage (memory), and processors for executing instructions that may be stored in memory. These user devices 140 may also run using a variety of different operating systems (e.g., iOS, Android), applications or computing languages (e.g., C++, JavaScript). An exemplary user device 140 is described in detail herein with respect to FIG. 5. Each user device 140 may be associated with participants (e.g., players) or other types (e.g., spectators) of users in relation to a current interactive session.

User devices 140 may include a set of different types of user devices located in a real-world space (e.g., living room, family room, playroom, or other building space) associated with a particular user or set of users. User devices 140 may include, for example, any device (including smart device) capable of outputting and/or capturing audio or sound, as well as communicating with other user devices 140 via a communication network or other connection. As such, user devices 140 may include home theater devices, televisions, soundbars, device controllers, handheld devices, speakers and sub-woofers, headsets (including headphones, ear-phones, or other head- or ear-mounted speakers), other peripheral or accessory devices that may include associated audio output components, and microphones (which may be separate from or built into another user device). Some devices may include both microphones and audio output components (e.g., speakers). Thus, user devices 140 may also be inclusive of smart home devices, Internet of Things (IoT) devices, virtual assistant devices, baby and pet moni-toring devices, etc.

As illustrated, synchronization server 120 may include API store 150, learning models 160, content generation 170, and content delivery 180. The digital content (e.g., from content source server 110, packaged by synchronization server 120) may be provided to a particular user device 140 using one or more APIs in API store 150, which allows various types of devices in network environment 100 to communicate with each other. The APIs in API store 150 may be specific to the particular operating language, system, platform, protocols, etc., of the content server 110, as well as the user devices 150 and other devices of network environment 100. In a network environment 100 that includes multiple different types of content servers 110 and user devices 140, there may likewise be a corresponding number of APIs that allow for various formatting, conver-sion, and other cross-device and cross-platform communi-cation processes for providing content and other services to different user devices 140, which may each respectively use different operating systems, protocols, etc., to process and render such content. As such, applications and services in different formats may be made available so as to be com-patible with a variety of different user device 140. The API 150 may further include additional information, such as metadata, about the accessed content or service to the user device 140. As described below, the additional information (e.g., object data, metadata) can be usable to provide details about the content or service being provided to the user device 140. In some embodiments, the services provided from the content servers 110 to the user device 140 via the API may include supporting services that are associated with other content or services, such as chat services, ratings, and profiles that are associated with a particular game, team, community, etc. In such cases, the content servers 110 may also communicate with each other via one of the APIs in API store 150.

Learning models 160 may be used to characterize the session attributes based on user characteristics and behav-iors, virtual objects, elements, events, gameplay trajectories and outcomes, etc., The learning models 160 may further correlate different sets of the identified session characteristics to different supplemental content file selections, com-binations, synchronization parameters, and device param-eters. Such learning models 160 may be generated and refined using artificial intelligence and machine learning techniques (e.g., similar to those used by large language models trained using large data corpora to learn patterns and make predictions with complex data) on historical and current session data, as well as supplemental content data.

Artificial intelligence and machine learning techniques may further be applied to train a learning model for a particular user based on session data, including game data, which may be captured during interactive sessions of the same or different (but similar) users and user devices. Such game data may include not only information regarding the game and other content titles being played, but also user profiles, chat communications (e.g., text, audio, video), captured speech or verbalizations, behavioral data, in-game events, actions, and behaviors, etc., associated with the interactive session. The game data may be analyzed to determine whether a current supplemental content package (e.g., selected set of supplemental content files, synchroni-zation parameters, device parameters) may be useful or otherwise suitable to the user. User reactions and comments during the presentation of a particular supplemental content file (e.g., which may be presented concurrent with a pre-sentation of virtual environment during gameplay on another device), for example, may be used to refine future determi-nations as to whether to the include the supplemental content file in future sessions, how to synchronize the supplemental content file presentation to current gameplay, and any pre-ferred device settings.

In some implementations, other content titles associated with the user (e.g., favorite games, music, books, movies, etc.) may be received from or otherwise discerned in relation to the user, social circles, or service providers, as well as used as bases for selecting supplemental content files to provide or present during or in association with a current interactive session. In addition, game data may be monitored and stored in memory as object or activity files, which may be used for supervised and unsupervised learning whereby a model may be trained to recognize patterns between certain game/user data and associated user attributes, as well as to predict supplemental content files and presentation param-eters (e.g., synchronized to current interactive content pre-sentation display, modified for remote play) that would be suitable for a particular user. In some implementations, sets of the object files or activity files may be labeled in accor-dance with any combination of game metadata and user feedback during or in association with gameplay sessions.

In exemplary embodiments, media files, object files, and activity files may provide information to learning models 160 regarding current session conditions, which may also be used for evaluating supplemental content and for generating content packages. Learning models 160 may therefore use such recorded files to identify specific conditions of the current session, including players, characters, and objects at specific locations and events in the virtual environment. Based on such files, for example, learning models 160 may identify a relevant supplemental content file associated with the content title, virtual environment, virtual scene or in-game event (e.g., significant battles, proximity to breaking records), which may be used to dynamically generate an enriched, extended, or continued interactive experience dur-ing and throughout the current session. Such session con-ditions may drive how the device settings for different secondary devices may be used to generate a presentation of the supplemental content, thereby resulting in customized determinations as to whether and which device settings are applied and to what extent for each supplemental content file.

Such learning models 160 may be updated based on new feedback or analytics of gameplay and user feedback, which may include language, gestures, and behaviors. Where content and content presentation preferences are being analyzed, the model may further apply pattern recognition to user-associated gameplay and interactive sessions to identify common characteristics and to predict which characteristics may be correlated with better feedback, more successful gameplay, higher or more prolonged user engagement, or other outcome metric. User feedback may indicate certain preferences or ways in which the supplemental content may be selected, modified, and/or presented in a manner best-fitting the needs and preferences of the user. Such user feedback may be used not only to tailor subsequent supplemental content packages for sessions with the specific user, but also for sessions with users identified as sharing similar user attributes. In that regard, the learning models 160 may not only be constructed for or customized to a particular user, but may be used for user groups that share similarities. Further, the system may affirm such associations or patterns by querying a player for feedback on whether the supplemental content was helpful, interesting, or otherwise pleasing to the user and utilize the user feedback to further update and refine the model, as well as monitoring associated or concurrent chat communications and sensor data regarding the user to discern positive or negative reactions.

In some implementations, the sensor data may also provide data regarding the surrounding environment (e.g., noise level, light level, movement or transit status) or gameplay patterns of the user, which may be used to select or modify device parameters and settings. For example, calendars, sensors, and device usage data may be used to determine that a user is in transit (e.g., location on a public transportation line), only uses a mobile device, and limited bandwidth usage during certain periods of the day. As such, supplemental content selected for such a user may be downloaded to the mobile device for offline usage ahead of the time periods during which the user device is predicted to be offline or otherwise have minimal bandwidth usage. Learning models 160 may also be used to correlate different environmental conditions to different devices (and parameters/settings thereof) that may be used to generate and present a display of supplemental content.

The machine learning model may thus be trained to process session data in conjunction with supplemental content data to identify one or more session characteristics that may be positively correlated to supplemental content based on, e.g., input or feedback from the user, user characteristics, prior selections or modifications, one or more parameters for the game title, data pertaining to one or more additional users, databases, etc. The identified supplemental content selections and presentation parameters (e.g., synchronization and device setting options) may thus be correlated to characteristics of a particular game session, which may be presented on one device concurrent with a synchronized presentation of the selected supplemental content. In some embodiments, the supplemental content may be used to transfer, extend, or otherwise supplement the gameplay experience to another (e.g., mobile) device, which may include continued gameplay (e.g., side quest), development of associated gameplay skills (e.g., practice or tutorial session), background materials relating to the game title (e.g., character profiles and back stories, storylines, video clips), task planning, and optimized pathing.

Session data may be captured and stored in activity files that may be provided to machine learning models 160 for analysis as to the current session conditions, e.g., digital content title, what virtual (e.g., in-game) objects, entities, activities, and events that users have engaged with, and thus support analysis of and coordination of supplemental content generation, delivery, and synchronization to current virtual interactive and/or in-game activities. Each user interaction within a virtual environment may be associated with the metadata for the type of virtual interaction, location within the virtual environment, and point in time within a virtual world timeline, as well as other players, objects, entities, etc., involved. Thus, metadata can be tracked for any of the variety of user interactions that can occur in during a current interactive session, including associated virtual activities, entities, settings, outcomes, actions, effects, locations, and character stats. Such data may further be aggregated, applied to learning models 160, and subject to analytics to make predictions as to the current interactive session, associated supplemental content, and how to synch or otherwise coordinate presentations across a current device setup and any secondary devices.

For example, various content titles may depict one or more objects (e.g., involved in in-game activities) with which a user can interact, and associated supplemental content may include user-generated content (e.g., screen shots, videos, commentary, mashups, etc.) created by peers, publishers of the media content titles and/or third party publishers as to a particular virtual character, object, or activity in the current interactive session. Such supplemental content may include metadata by which to search for such supplemental content. The supplemental content may also include information about the media and/or peer. Such peer information may be derived from data gathered during peer interaction with an object of an interactive content title (e.g., a video game, interactive book, etc.) and may be "bound" to and stored with the supplemental content file. Such binding enhances the supplemental content file as the supplemental content file may also include a deep link (e.g., directly launch) to associated objects, events, activities, or other supplemental content.

Different machine learning m models may be trained using different types of data input, which may be specific to the user, the user demographic, associated game or other interactive content title(s) and genres thereof, social contacts, etc. Using the selected data inputs, therefore, the machine learning model may be trained to identify attributes of a specific user and identify supplemental content parameters that may be specifically relevant to the requesting user (e.g., cartoon-like content for young children, basic instructional content for beginning players, complex diagrams and strategic content for advanced or expert players).

Identified session attributes may be associated with a different pattern of in-game behaviors and associated supplemental content. A pattern of certain positive actions or reactions towards a type of supplemental content may reinforce associations with certain players or types of gameplay, for example. For example, certain tutorial content presented during certain game sequences may be strongly correlated with improved gameplay and happy or excited user reactions. Similarly, certain supplemental content (e.g., back story) may be correlated with increased user interest and prolonged engagement as indicated by user speech and behaviors (real-world and in-game/virtual).

Supplemental content may further include task planning tools presented on one or more of the user devices 140. Such task planning tools may allow a user to create a queue of activities, select preferred settings, schedule sessions with teams or opponents, plan in-game events and actions, and otherwise organize and coordinate interactive activities. The task planning tools may further use historical gameplay data, as well as artificial intelligence and machine learning, to optimize their tasks, plans, and paths. Activity files and object files associated with historical gameplay of the user may include express selections and observed behaviors that may be used by the task planning tools to make suggestions or recommendations. In some implementations, a learning model may be constructed based on the activity files and object files from past sessions, whereby user preferences, gameplay style, pace of completion, and other patterns of behavior may be identified and applied to new activities, titles, and sessions.

Content generation server 170 may execute instructions to select a set of supplemental content files from a repository of available supplemental content based on characteristics of a current interactive session. Different supplemental content files may be geared towards different types of users/players, interactive events, devices, or other session characteristics. A subset of the available supplemental content files may therefore be identified by one or more learning models 160 as being correlated with a particular current interactive session. The selected files may be packaged in accordance with one or more secondary devices associated with a user of the current interactive session. For example, the user may be using one device setup of user devices 140 (e.g., television and game console) to generate a presentation of the virtual environment of a game title, but may further be associated with other available user devices (e.g., another television, laptop, display monitor, mobile device, tablet, IoT device).

Content generation server 170 may determine whether one or more secondary devices may be available to the user for extended or continued user interactive experiences. Selection of one or more of the available secondary devices may be based on express, observed, or predicted user preference, preferences of similar users, etc., which may include applying learning models 160 to previous interactive sessions in which secondary devices were selected and used to present supplemental content. In some instances, content generation server 170 may present various options (e.g., menu) o the user for selection as to preferred supplement content files, file types, presentation types, secondary devices, or other preferences. Content generation server 170 may also generate recommendations based on applying learning models 160 to data regarding the user, similar users, or similar sessions. Based on the secondary device(s) identified as available, content generation server 170 may generate a supplemental content package including one or more selected supplemental content files. The supplemental content package may include a queued sequence for the files, which may also be presented to the user for selection.

The supplemental content package may be generated based on one or more APIs in API store 150 and may further include synchronization data for synching specific supplemental content files (or portions thereof) to specific portions of the current interactive session. For example, a current gameplay session may be predicted to include certain objects, characters, events, etc., that elicit certain actions. A specific supplemental content file that includes instructional content related to a predicted action may therefore be synchronized to play (e.g., on a second screen of a secondary user device) at a point during the gameplay session in which the action is predicted or recommended.

The content delivery network server 180 may include a server that provides resources, files, etc., related to the content from content servers 110, including various content and service configurations, to user devices 140. The content delivery service 180 can also be called upon by the user devices 140 that request to access specific content or services. Content delivery 180 may include universe management servers, game servers, streaming media servers, servers hosting downloadable content, and other content delivery servers known in the art.

Figures 2A, 2B:
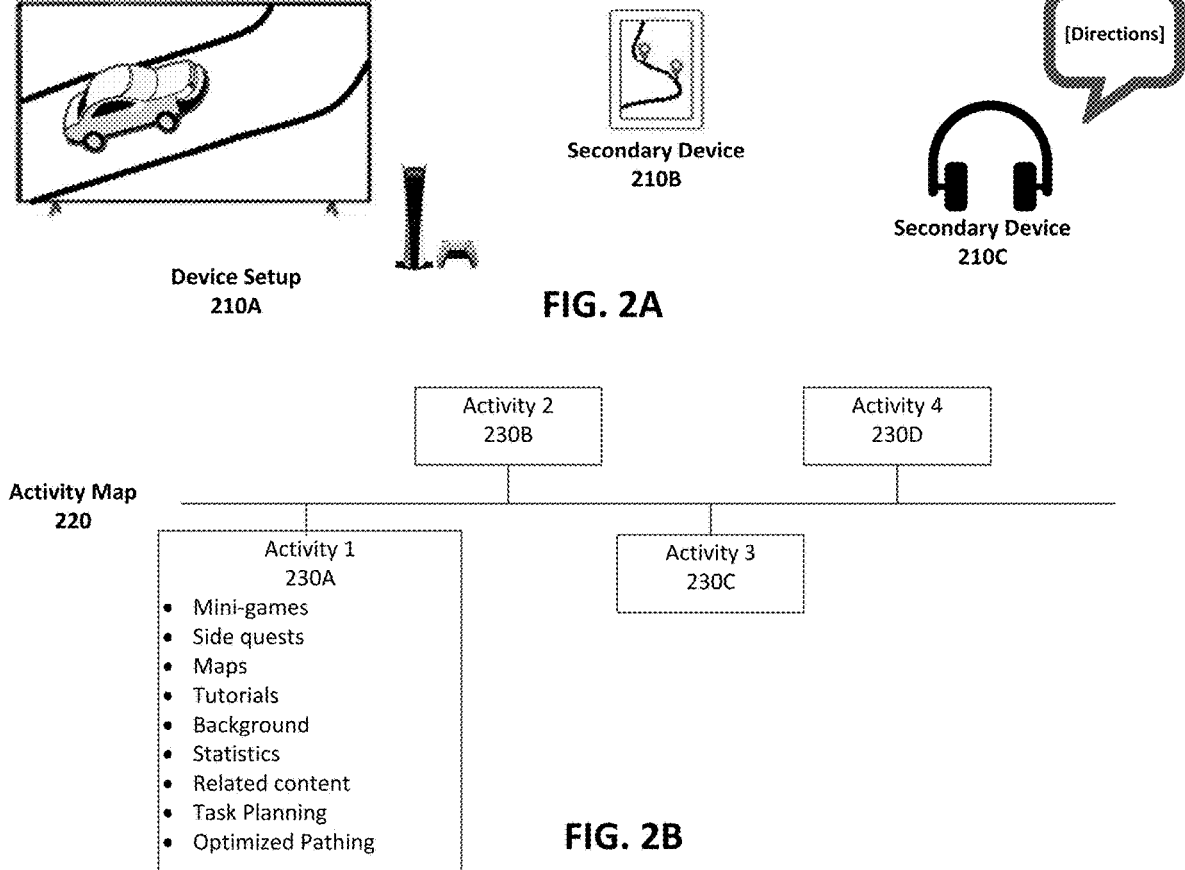
FIG. 2A illustrates an exemplary implementation of a system for dynamic content display generation and synchronization for multiple device setups.
FIG. 2B illustrates an exemplary activity map of available content used to generate dynamic content for multiple device setups

FIG. 2A illustrates an exemplary implementation of a system for dynamic content display generation and synchronization for multiple device setups. A current interactive session may include a presentation of a virtual environment of a particular title using a device setup 210A, which may include a television and a game console. The current interactive session may be monitored to identify one or more characteristics thereof, including specific game title, player (s), virtual environment, avatars or characters, events, actions, etc. In addition, a user of the current interaction session may be identified as associated with one or more secondary devices 210B and 210C. Based on the identified characteristics of the current interactive session and the identified secondary devices 210B and 210C, content generation server 170 (e.g., in conjunction with learning models 160) may select a set of supplemental content files to package and provide to secondary devices 210B and 210C.

Generation of the package may further include data for coordinating the presentation of the selected set of supplemental content files to associated portions of the current interactive session. Such coordination may include synchronizing the presentation of one or more of the supplemental content files on secondary devices 210B and 210C to the presentations of the virtual environment by device setup 210A. As illustrated, supplemental content files delivered to and presented by secondary device 210B may include a map associated with the current presentation of the virtual environment on device setup 210A; and supplemental content files delivered to and presented by secondary device 210C may include audio directions associated with the current presentation of the virtual environment on device setup 210A. The synchronization (e.g., turn-by-turn directions) may be provided in real-time as actions or events occur in the virtual environment. In some implementations, coordination may include handoff from device setup 210A to one or more of secondary devices 210B and 210C for continued or related gameplay (e.g., side quests, mini-games). As such, the user may continue to engage with related supplemental content under a variety of different conditions and limitations on availability of device setup 210A.

FIG. 2B illustrates an exemplary activity map 220 of available content used to generate dynamic content for multiple device setups. As illustrated, activity map 220 may include data regarding multiple different activities (e.g., Activities 1-4) available in an interactive content title. Each activity may further be associated with a respective set of supplemental content 230A-D, which may be filtered, selected, packaged with associated device parameters and synchronization data, and provided to one or more secondary devices 210B and/or 210C.

Figure 3:
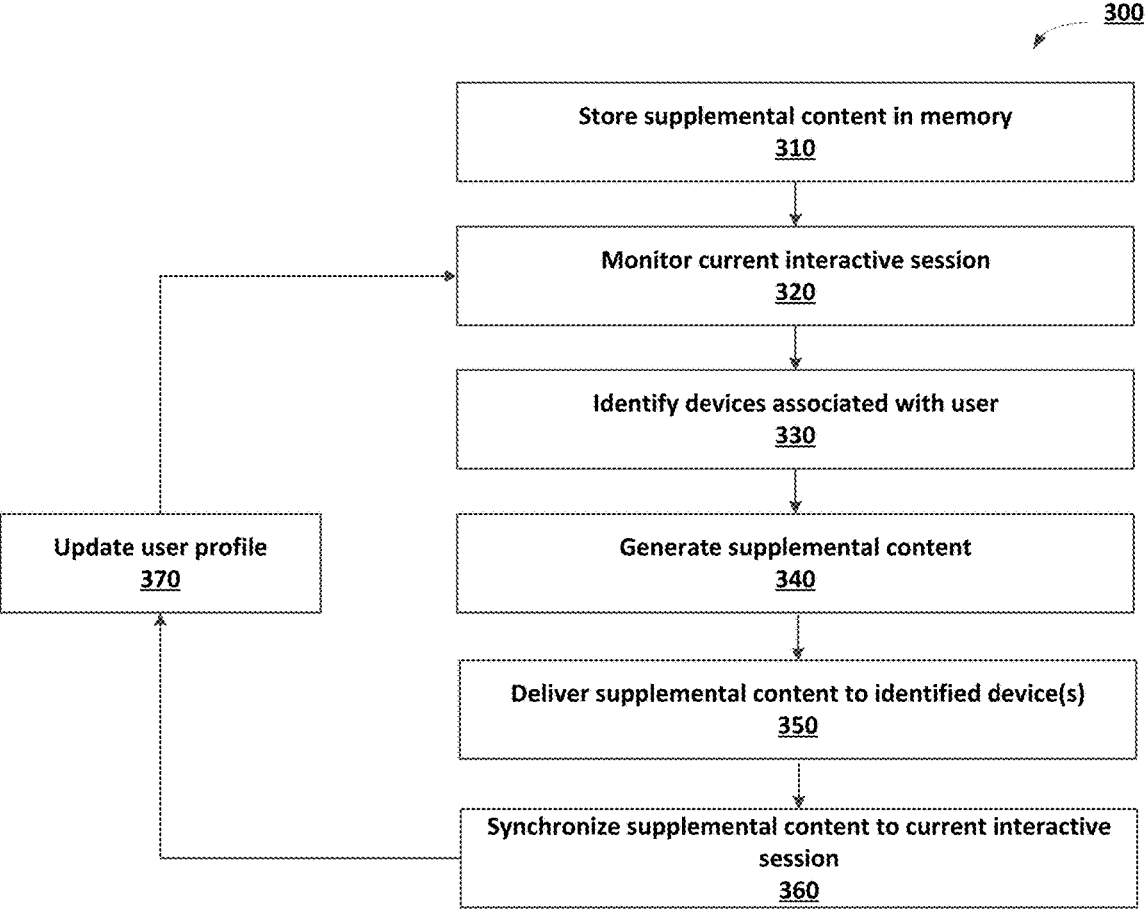
FIG. 3 is a flowchart illustrating an exemplary method for dynamic content display generation and synchronization for multiple device setups.

FIG. 3 is a flowchart illustrating an exemplary method 300 for dynamic content display generation and synchronization for multiple device setups. The method 300 of FIG. 3 may be embodied as executable instructions in a non-transitory computer readable storage medium including but not limited to a CD, DVD, or non-volatile memory such as a hard drive. The instructions of the storage medium may be executed by a processor (or processors) to cause various hardware components of a computing device hosting or otherwise accessing the storage medium to effectuate the method. The steps identified in FIG. 3 (and the order thereof) are exemplary and may include various alternatives, equivalents, or derivations thereof including but not limited to the order of execution of the same.

In step 310, supplemental content files may be stored in memory (e.g., databases 130) in association with one or more interactive content titles. Each supplemental content file may include one or more parameters specific to a type of user device. In some embodiments, supplemental content may also be correlated to types of users, and a user may be associated with a user profile that specifies their personal preferences and priorities in relation to different types of supplemental content and gameplay experiences as indicated by express input, observed behaviors, or predicted based on application of learning models 160.

In step 320, a current interactive session that includes one or more user devices 140 (or device setup 210A) may be monitored by synchronization server 120, which may also—via sensors associated with user devices 140—monitor the real-world surroundings of the user within the real-world space. A user using a device setup 210A to stream and play digital content in a current session may be presented with a virtual environment display associated with the digital content. The digital content may be a game in which the player may be currently interacting with virtual objects and characters, as well as performing virtual actions in the virtual environment.

In step 330, one or more secondary devices may be identified as being associated with a particular user and available for use in presenting supplemental content. Such identification may be based on user profiles, device detection within the real-world space, device status and capabilities, calendars, etc. The user may also have specified preferences for which devices to use, which types of supplemental content are preferred for specific devices, and other preferences for controlling or coordinating the presentation of supplemental content in relation to the currently active sessions.

In step 340, a supplemental content package may be generated by content generation server 170. The supplemental content package may include a set of one or more selected supplemental content files selected based on the characteristics of the current interactive session identified in step 310 and the secondary devices identified as available in step 320. The supplemental content package may further include a queue, synchronization data, metadata, or other control data executable by secondary devices 210B-C to coordinate presentation of the supplemental content files in the set.

In step 350, the supplemental content package may be delivered to the identified secondary devices 210B-C. Such delivery may include streaming or downloading files to each of the secondary devices 210B-C over a communication network. In some implementations, the supplemental content package may include files and data provided from the same or different sources in network environment 100.

In step 360, the secondary devices 210B-C may generate respective audio and/or visual presentations of the supplemental content files. Such presentation by secondary devices 210B-C may also be synchronized to the presentation of the current interactive session by device setup 210A. The concurrent presentation(s) of supplemental content file(s) by one or more secondary devices 210B-C may thus provide for a more enriched user experience beyond the current interactive session.

In step 370, the user, their associated gameplay or virtual interactions, and any reaction data may be monitored and used to update a user profile. For example, the user may complete a gameplay challenge, and the updated status and statistics may be added to the user profile. Thus, when the user resumes gameplay using the original device setup 210A in a next session, the session may reflect the updated status. In addition, the updated status may be analyzed using learning models 160 to detect any new patterns, which may be used to modify future supplemental content packages that are generated for future sessions involving the user.

Figure 4:
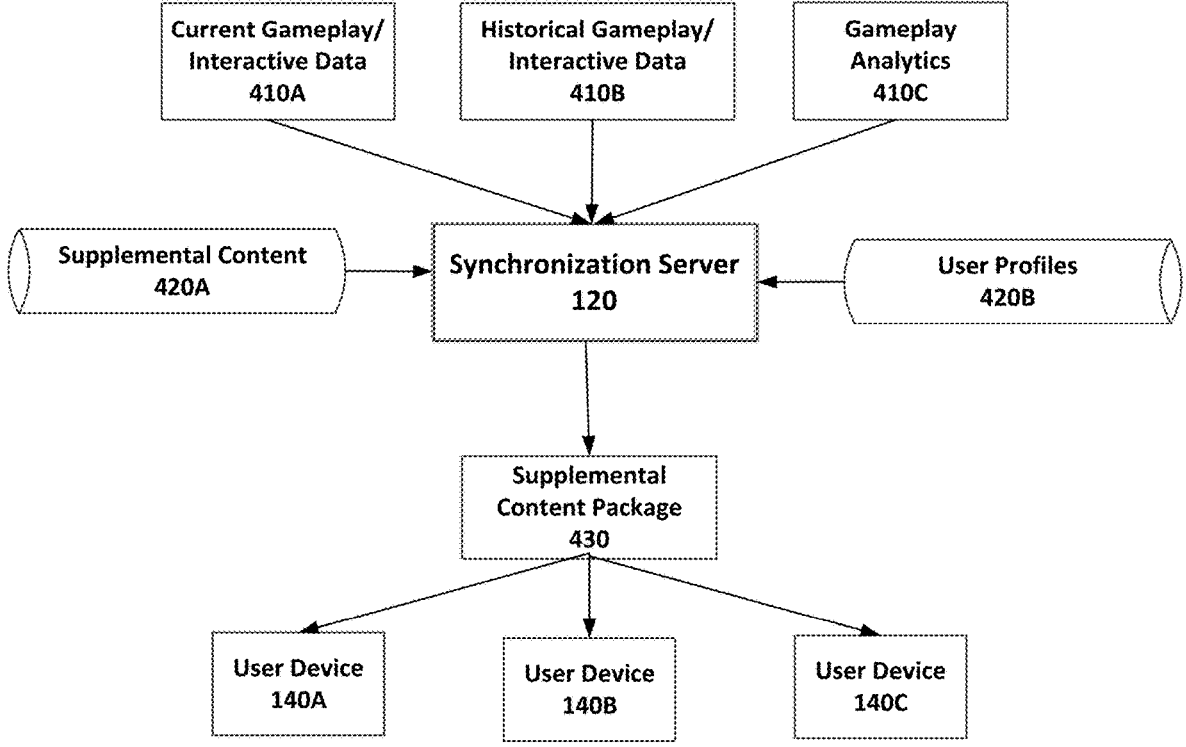
FIG. 4 is a diagram illustrating an exemplary data flow associated with dynamic content display generation and synchronization for multiple device setups.

FIG. 4 is a diagram illustrating an exemplary data flow associated with dynamic content display generation and synchronization for multiple device setups.

As illustrated, different sources of gameplay/interactive data may include current data 410A, historical data 410B, and analytics 410C. As discussed above, current data 410A may be captured and recorded during current sessions as media files, object files, and/or activity files. Current data 410A may also be stored in databases 130, which may further store historical data 410B. In addition, learning models 160 may be applied to either or both current data 410A and historical data 410B to identify patterns, trends, correlations, and predictions among the data sets.

Data sets 410A-C may be provided to synchronization server 120, which may also use supplemental content data 420A and user profiles 420B to generate a supplemental content package 430. The supplemental content package 430 may further be provided, in whole or in part, to each of the user devices 140A identified as being associated with the user and as being available for presentation of supplemental content.

Figure 5:
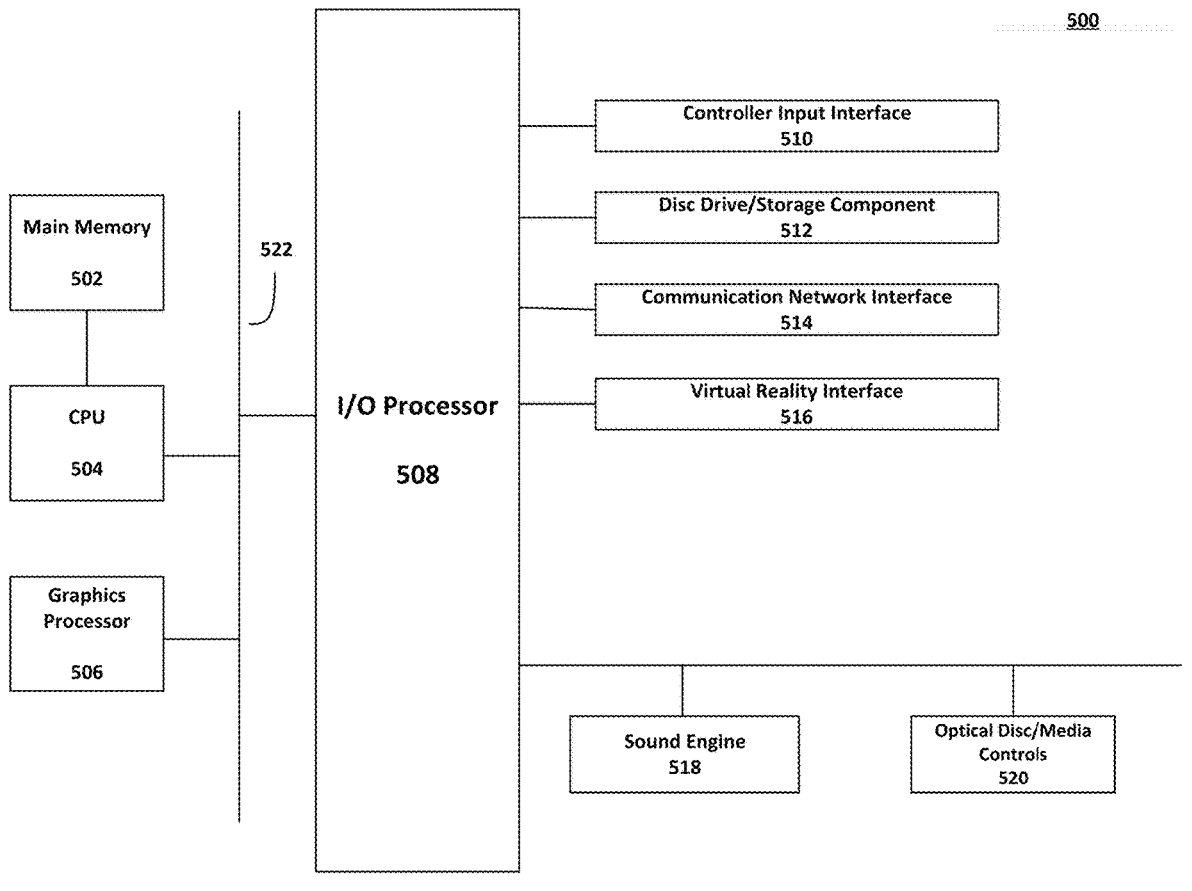
FIG. 5 is a block diagram of an exemplary electronic entertainment system that may be used in embodiments of the present invention.

FIG. 5 illustrates a block diagram of an exemplary electronic entertainment system 500 in accordance with an embodiment of the presently disclosed invention. The electronic entertainment system 500 as illustrated in FIG. 5 includes a main memory 502, a central processing unit (CPU) 504, graphic processor 506, an input/output (I/O) processor 508, a controller input interface 510, a hard disc drive or other storage component 512 (which may be removable), a communication network interface 514, a virtual reality interface 516, sound engine 518, and optical disc/media controls 520. Each of the foregoing are connected via one or more system buses 522.

Electronic entertainment system 500 as shown in FIG. 5 may be an electronic game console. The electronic entertainment system 500 may alternatively be implemented as a general-purpose computer, a set-top box, a hand-held game device, a tablet computing device, or a mobile computing device or phone. Electronic entertainment systems may contain some or all of the disclosed components depending on a particular form factor, purpose, or design.

Main memory 502 stores instructions and data for execution by CPU 504. Main memory 502 can store executable code when the electronic entertainment system 500 is in operation. Main memory 502 of FIG. 5 may communicate with CPU 504 via a dedicated bus. Main memory 502 may provide pre-stored programs in addition to programs transferred through the I/O processor 508 from hard disc drive/storage component 512, a DVD or other optical disc (not shown) using the optical disc/media controls 520, or as might be downloaded via communication network interface 514.

The graphics processor 506 of FIG. 5 (or graphics card) executes graphics instructions received from the CPU 504 to produce images for display on a display device (not shown). The graphics processor 506 of FIG. 5 may transform objects from three-dimensional coordinates to two-dimensional coordinates, and vice versa. Graphics processor 506 may use ray tracing to aid in the rendering of light and shadows in a game scene by simulating and tracking individual rays of light produced by a source. Graphics processor 506 may utilize fast boot and load times, 4K-8K resolution, and up to 120 FPS with 120 hz refresh rates. Graphics processor 506 may render or otherwise process images differently for a specific display device.

I/O processor 508 of FIG. 5 may also allow for the exchange of content over a wireless or other communications network (e.g., IEEE 802.x inclusive of Wi-Fi and Ethernet, 5G, 4G, LTE, and 5G mobile networks, and Bluetooth and short-range personal area networks). The I/O processor 508 of FIG. 5 primarily controls data exchanges between the various devices of the electronic entertainment system 500 including the CPU 504, the graphics processor 506, controller interface 510, hard disc drive/storage component 512, communication network interface 514, virtual reality interface 516, sound engine 518, and optical disc/media controls 520.

A user of the electronic entertainment system 500 of FIG. 5 provides instructions via a controller device communicatively coupled to the controller interface 510 to the CPU 504. A variety of different controllers may be used to receive the instructions, including handheld and sensor-based controllers (e.g., for capturing and interpreting eye-tracking-based, voice-based, and gestural commands). Controllers may receive instructions or input from the user, which may then be provided to controller interface 510 and then to CPU 504 for interpretation and execution. The instructions may further be used by the CPU 504 to control other components of electronic entertainment system 500. For example, the user may instruct the CPU 504 to store certain game information on the hard disc drive/storage component 512 or other non-transitory computer-readable storage media. A user may also instruct a character in a game to perform some specified action, which is rendered in conjunction with graphics processor 506, inclusive of audio interpreted by sound engine 518.

Hard disc drive/storage component 512 may include removable or non-removable non-volatile storage medium. Saud medium may be portable and inclusive of digital video disc, Blu-Ray, or USB coupled storage, to input and output data and code to and from the main memory 502. Software for implementing embodiments of the present invention may be stored on such a medium and input to the main memory via the hard disc drive/storage component 512. Software stored on hard disc drive 512 may also be managed by optical disk/media control 520 and/or communications network interface 514.

Communication network interface 514 may allow for communication via various communication networks, including local, proprietary networks and/or larger wide-area networks such as the Internet. The Internet is a broad network of interconnected computers and servers allowing for the transmission and exchange of Internet Protocol (IP) data between users connected through a network service provider. Examples of network service providers include public switched telephone networks, cable or fiber services, digital subscriber lines (DSL) or broadband, and satellite services. Communications network interface allows for communications and content to be exchanged between the various remote devices, including other electronic entertainment systems associated with other users and cloud-based databases, services and servers, and content hosting systems that might provide or facilitate game play and related content.

Virtual reality interface 516 allows for processing and rendering of virtual reality, augmented reality, and mixed reality data. This includes display devices such that might be partial or entirely immersive virtual environments. Virtual reality interface 516 may allow for exchange and presentation of immersive fields of view and foveated rendering in coordination with sounds processed by sound engine 518 and haptic feedback.

Sound engine 518 executes instructions to produce sound signals that are outputted to an audio device such as television speakers, controller speakers, stand-alone speakers, headphones or other head-mounted speakers. Different sets of sounds may be produced for each of the different sound output devices. This may include spatial or three-dimensional audio effects.

Optical disc/media controls 520 may be implemented with a magnetic disk drive or an optical disk drive for storing, managing, and controlling data and instructions for use by CPU 504. Optical disc/media controls 520 may be inclusive of system software (an operating system) for implementing embodiments of the present invention. That system may facilitate loading software into main memory 502.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

The present invention may be implemented in an application that may be operable using a variety of devices. Non-transitory computer-readable storage media refer to any medium or media that participate in providing instructions to a central processing unit (CPU) for execution. Such media can take many forms, including, but not limited to, non-volatile and volatile media such as optical or magnetic disks and dynamic memory, respectively. Common forms of non-transitory computer-readable media include, for example, a floppy disk, a flexible disk, a hard disk, magnetic tape, any other magnetic medium, a CD-ROM disk, digital video disk (DVD), any other optical medium, RAM, PROM, EPROM, a FLASHEPROM, and any other memory chip or cartridge.

Various forms of transmission media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU. Various forms of storage may likewise be implemented as well as the necessary network interfaces and network topologies to implement the same.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

What is claimed is:

1. A method comprising:

storing a plurality of supplemental content files in memory, wherein each of the plurality of supplemental content files is associated with an interactive content title and one or more parameters that are specific to a type of device, the one or more parameters comprising one or more parameters indicative of one or more audiovisual capabilities and settings;

monitoring an interactive session associated with at least a first device of a user, wherein the interactive session includes a presentation of a virtual environment associated with the interactive content title and generated by the first device;

identifying a type of a second device associated with the user;

selecting a supplemental content file from the plurality of supplemental content files based on the type of the second device;

generating a supplemental content package for the second device, the supplemental content package comprising the supplemental content file and the one or more parameters associated with the type of the second device; and providing the supplemental content package to the second device during the interactive session, wherein the second device is configured to generate a presentation of the supplemental content file in the supplemental content package in accordance with the one or more parameters in the supplemental content package.

2. The method of claim 1, wherein the supplemental content package further includes synchronization data associated with one or more actions during the interactive session, and wherein the second device is configured to synchronize the presentation of the supplemental content file to the presentation of the virtual environment by the first device using the synchronization data.

3. The method of claim 2, wherein monitoring the interactive session includes identifying a status of an interactive activity taking place within the virtual environment in real-time, and further comprising predicting the actions based on the identified status, wherein selecting the supplemental content file is based on the prediction.

4. The method of claim 2, further comprising:

storing a first device set up comprising the first device, and a second device set up comprising the second device; and detecting a switch to the second device setup from the first device setup.

5. The method of claim 4, wherein detecting the switch to the second device setup is based on sensor data captured by one or more sensors associated with one or more of the first device or the second device.

6. The method of claim 5, wherein the second device is configured to generate presentation of the supplemental content file further based on the sensor data.

7. The method of claim 1, further comprising identifying a type of a third device associated with the user, the type of the third device being different from the type of the second device, wherein the supplemental content package includes a plurality of portions associated with respective sets of parameters associated with the type of the second device and the type of the third device, respectively.

8. The method of claim 1, wherein the supplemental content package includes a queue including the supplemental content file.

9. The method of claim 1, further comprising generating a menu of options corresponding to the supplemental content file, wherein generating the supplemental content package includes identifying the selected supplemental content file based on one or more options selected from the menu of options.

10. The method of claim 1, further comprising generating one or more recommendations corresponding to the supplemental content file based on application of a learning model to the interactive session, wherein generating the supplemental content package includes identifying the supplemental content file based on the recommendations.

11. A system comprising:

memory that stores a plurality of supplemental content files, wherein each of the plurality of supplemental content files is associated with an interactive content title and one or more parameters that are specific to a type of device;

a communication interface that is configured to communicate over a communication network, wherein the communication interface is configured to receive data regarding an interactive session associated with at least a first device of a user;

a processor that is configured to execute instructions stored in memory, wherein, upon execution of the instructions, cause the processor to:

monitor the interactive session, wherein the interactive session includes a presentation of a virtual environment associated with the interactive content title and generated by the first device;

identify a type of a second device associated with the user;

select a supplemental content file from the plurality of supplemental content files based on the identified type of the second device; and generate a supplemental content package for the second device, the supplemental content package comprising the selected supplemental content file and the one or more parameters associated with the type of the second device, the one or more parameters comprising one or more parameters indicative of one or more audiovisual capabilities and settings, wherein the communication interface is configured to provide the supplemental content package to the second device during the interactive session, wherein the second device is configured to generate a presentation of the supplemental content file in the supplemental content package in accordance with the one or more parameters in the supplemental content package.

12. The system of claim 11, wherein the supplemental content package further includes synchronization data associated with one or more actions during the interactive session, and wherein the second device is configured to synchronize the presentation of the supplemental content file to the presentation of the virtual environment by the first device using the synchronization data.

13. The system of claim 12, wherein the processor is configured to monitor the interactive session by identifying a status of an interactive activity taking place within the virtual environment in real-time, and further configured to execute further instructions to predict the actions based on the identified status, wherein selecting the supplemental content file is based on the prediction.

14. The system of claim 12, wherein the memory is configured to store a first device setup comprising the first device, and a second device setup comprising the second device, and wherein the processor is further configured to execute instructions to detect a switch to the second device setup from the first device setup.

15. The system of claim 14, wherein the processor is configured to detect the switch to the second device setup based on sensor data captured by one or more sensors associated with one or more of the first device or the second device.

16. The system of claim 15, wherein the second device is configured to generate presentation of the supplemental content file further based on the sensor data.

17. The system of claim 11, wherein the processor is further configured to identify a third device associated with the user, the type of the third device being different from the type of the second device, and wherein the supplemental content package includes a plurality of portions associated with respective sets of parameters associated with the type of the second device and the type of the third device, respectively.

18. The system of claim 11, wherein the supplemental content package includes a queue including the supplemental content file.

19. The system of claim 11, wherein the processor is further configured to executes instructions to generate a menu of options corresponding to the supplemental content file, wherein the processor is configured to generate the supplemental content package by identifying the selected supplemental content file based on one or more options selected from the menu of options.

20. The system of claim 11, wherein the processor is further configured to execute instructions to generate one or more recommendations corresponding to the supplemental content file based on application of a learning model to the interactive session, and wherein the processor is configured to identify the supplemental content file based on the one or more recommendations.

21. A non-transitory, computer-readable storage medium, having embodied thereon a program executable by a processor to perform a method comprising:

storing a plurality of supplemental content files in memory, wherein each of the plurality of supplemental content files is associated with an interactive content title and one or more parameters that are specific to a type of device, the one or more parameters comprising one or more parameters indicative of one or more audiovisual capabilities and settings;

monitoring an interactive session associated with at least a first device of a user, wherein the interactive session includes a presentation of a virtual environment associated with the interactive content title and generated by the first device;

identifying a type of a second device associated with the user;

selecting a supplemental content file from the plurality of supplemental content files based on the identified type of the second device;

generating a supplemental content package for the second device, the supplemental content package comprising the supplemental content file and the one or more parameters associated with the type of the second device; and providing the supplemental content package to the second device during the interactive session, wherein the second device is configured to generate a presentation of the supplemental content file in the supplemental content package in accordance with the one or more parameters in the supplemental content package.

* * * * *